United States Patent
Ishii et al.

(10) Patent No.: US 10,584,810 B2
(45) Date of Patent: Mar. 10, 2020

(54) HYDROGEN-DISPENSING HOSE

(71) Applicant: The Yokohama Rubber Co., LTD., Minato-ku, Tokyo (JP)

(72) Inventors: Katsumasa Ishii, Hiratsuka (JP); Ikuma Yusa, Hiratsuka (JP); Hiroaki Shibano, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 34 days.

(21) Appl. No.: 15/579,912

(22) PCT Filed: Jun. 1, 2016

(86) PCT No.: PCT/JP2016/066230
§ 371 (c)(1),
(2) Date: Dec. 5, 2017

(87) PCT Pub. No.: WO2016/199643
PCT Pub. Date: Dec. 15, 2016

(65) Prior Publication Data
US 2018/0172185 A1  Jun. 21, 2018

(30) Foreign Application Priority Data

Jun. 9, 2015  (JP) ................................ 2015-116763
Feb. 5, 2016  (JP) ................................ 2016-020574

(51) Int. Cl.
*F16L 11/00* (2006.01)
*F16L 11/08* (2006.01)
(Continued)

(52) U.S. Cl.
CPC .............. *F16L 11/086* (2013.01); *B32B 1/08* (2013.01); *B32B 5/12* (2013.01); *B32B 5/24* (2013.01);
(Continued)

(58) Field of Classification Search
CPC ............................ F16L 11/086; F16L 11/087
(Continued)

(56) References Cited

U.S. PATENT DOCUMENTS 4,130,139 A * 12/1978 Haren .................. B29D 23/001
  138/125
4,196,464 A *  4/1980 Russell ................. F16L 11/086
  361/215

(Continued)

FOREIGN PATENT DOCUMENTS

JP   S49-012260   3/1974
JP   S54-004090   3/1979
(Continued)

OTHER PUBLICATIONS

International Search Report for International Application No. PCT/JP2016/066230 dated Aug. 16, 2016, 4 pages, Japan.

*Primary Examiner* — James F Hook
(74) *Attorney, Agent, or Firm* — Thorpe North & Western

(57) ABSTRACT

Provided is a hydrogen-dispensing hose. At least two reinforcing layers are coaxially layered between an inner surface layer of a thermoplastic resin having a dry hydrogen gas permeability coefficient at 90° C. of $1\times10^{-8}$ cc·cm/cm²·sec·cmHg or less and an outer surface layer of a thermoplastic resin. A wire braided layer formed by braiding metal wires is used as the outermost reinforcing layer. Fiber braided layers formed by braiding high-strength fibers such as polyparaphenylene benzobisoxazole fibers are used as the other reinforcing layers.

6 Claims, 3 Drawing Sheets

(51) Int. Cl.
*B32B 5/26* (2006.01)
*B32B 5/12* (2006.01)
*B32B 27/06* (2006.01)
*B32B 27/12* (2006.01)
*B32B 27/34* (2006.01)
*B32B 27/36* (2006.01)
*D04C 1/02* (2006.01)
*D04C 1/06* (2006.01)
*B32B 1/08* (2006.01)
*B32B 5/24* (2006.01)

(52) U.S. Cl.
CPC ............... *B32B 5/26* (2013.01); *B32B 27/06* (2013.01); *B32B 27/12* (2013.01); *B32B 27/34* (2013.01); *B32B 27/36* (2013.01); *D04C 1/02* (2013.01); *D04C 1/06* (2013.01); *F16L 11/087* (2013.01); *B32B 2262/02* (2013.01); *B32B 2262/103* (2013.01); *B32B 2597/00* (2013.01); *D10B 2101/20* (2013.01); *D10B 2331/14* (2013.01); *D10B 2505/12* (2013.01)

(58) Field of Classification Search
USPC .................................................. 138/125, 127
See application file for complete search history.

(56) References Cited

U.S. PATENT DOCUMENTS

| | | | |
|---|---|---|---|
| 4,384,595 A | 5/1983 | Washkewicz et al. | |
| 4,952,262 A * | 8/1990 | Washkewicz | B29D 23/001 156/149 |
| 5,183,079 A * | 2/1993 | Blin | F16L 11/086 138/110 |
| 5,362,530 A * | 11/1994 | Kitami | B32B 27/08 428/36.2 |
| 6,112,771 A * | 9/2000 | Aoyagi | F16L 11/087 138/126 |
| 6,792,978 B2 * | 9/2004 | Ainsworth | B32B 1/08 138/125 |
| 6,889,716 B2 * | 5/2005 | Lundberg | F16L 9/123 138/124 |
| 2008/0041484 A1* | 2/2008 | Haines | B32B 1/08 138/126 |
| 2010/0143630 A1* | 6/2010 | Gong | C08K 3/26 428/36.8 |
| 2013/0000767 A1* | 1/2013 | Nonaka | B29C 70/026 138/106 |
| 2014/0373962 A1* | 12/2014 | Lamontia | F16L 11/086 138/125 |
| 2015/0090358 A1* | 4/2015 | Lamontia | B32B 5/022 138/125 |

FOREIGN PATENT DOCUMENTS

| | | |
|---|---|---|
| JP | S62-108685 | 7/1987 |
| JP | H03-080095 | 12/1991 |
| JP | H09-014518 | 1/1997 |
| JP | H11-141751 | 5/1999 |
| JP | 2010-031993 | 2/2010 |
| JP | 2011-158054 | 8/2011 |
| WO | WO 2011/067798 | 6/2011 |

* cited by examiner

HYDROGEN-DISPENSING HOSE

TECHNICAL FIELD

The present technology relates to a hydrogen-dispensing hose, and, more specifically, to a hydrogen-dispensing hose that allows improved pressure resistance and durability while suppressing disruption of and internal-pressure-induced dimensional changes in a reinforcing layer at a section at which a hose fitting is crimped.

BACKGROUND ART

Recent years have seen vigorous development in fuel cell vehicles and the like. Concurrently, hoses for dispensing hydrogen to fuel cell vehicles and the like from a dispenser installed in a hydrogen station have also been developed. Such hydrogen-dispensing hoses require superior hydrogen gas permeation resistance. Because fuel tanks must be filled with hydrogen gas at high pressure in order to increase the travel distance of a fuel cell vehicle or the like, a hydrogen-dispensing hose must have practical utility capable of withstanding high levels of internal pressure of 70 MPa and greater. Strengthening reinforcing layers is a common method of improving the pressure resistance of a hose; however, if a metal reinforcing material is used as a constituent member of a reinforcing layer, there is the risk of the metal being made brittle by the hydrogen, thereby reducing the life of the hose. Thus, proposals have been made to form all reinforcing materials by braiding polyparaphenylene benzobisoxazole (PBO) fibers (see Japanese Unexamined Patent Application Publication Nos. 2010-31993 and 2011-158054).

A hose fitting including a nipple and a socket is attached to an end of the hose. Typically, to attach the hose fitting to the hose, an end of the hose is sandwiched between the nipple and the socket, and, in that state, the socket is crimped, i.e., deformed so as to decrease in diameter, by compressing the outer circumferential surface of the socket. Because a hydrogen-dispensing hose such as described above must have high pressure resistance, there must be a commensurate improvement in the leak resistance and seal integrity of the hose fitting, resulting in increased crimping force. Excessive crimping force will result in disruption of the braided structure of the reinforcing layers (especially the outermost reinforcing layer). In addition, as the pressure of the hydrogen flowing through the hose increases, the degree of dimensional change (increased diameter and axial contraction, or decreased diameter and axial elongation) in the hose will increase, thereby promoting disruption of the braided structure of the reinforcing layers in the section crimped by the hose fitting. Such disruption of the braided structure is a factor that reduces the pressure resistance and durability of the hose.

In addition, as hydrogen pressure increases, the inner surface layer is subjected to greater internal pressure, and is liable to exhibit dimensional change (diameter-expansive deformation, etc.). The inner surface layer contacting the hydrogen is subjected to low, below-freezing temperatures (for example, around −40° C.), causing the layer to become brittle, and thus liable to be damaged even by small dimensional changes. Thus, it is necessary to suppress dimensional changes in the hose in order to improve the pressure resistance and durability of the hose.

A hose provided with a fiber reinforced layer formed by braiding PBO fibers has superior pressure resistance and durability. However, in a hose in which the reinforcing layer is constituted only by a fiber reinforced layer of braided high-strength fibers of this sort, it is difficult to ensure sufficient pressure resistance and durability if the pressure of the flowing hydrogen is greater than normal. This also impedes suppression of dimensional changes in the inner surface layer. Thus, improvement is desired.

SUMMARY

The present technology provides a hydrogen-dispensing hose that allows improved pressure resistance and durability while suppressing disruption of and internal-pressure-induced dimensional changes in a reinforcing layer at a section at which a hose fitting is crimped.

A hydrogen-dispensing hose according to the present technology is a hydrogen-dispensing hose comprising a coaxially layered inner surface layer and outer surface layer; and at least two reinforcing layers coaxially layered between the coaxially layered inner layer and outer surface layer, the inner surface layer being formed from a thermoplastic resin having a dry hydrogen gas permeability coefficient at 90° C. of $1 \times 10^{-8}$ cc·cm/cm$^2$·sec·cmHg or less, and the outer surface layer being formed from a thermoplastic resin. The outermost reinforcing layer out of the reinforcing layers is a wire braided layer formed by braiding metal wires, and the other reinforcing layers are fiber braided layers formed by braiding high-strength fibers.

In accordance with the present technology, the inner surface layer is formed from a thermoplastic resin of good hydrogen gas barrier properties, having a dry hydrogen gas permeability coefficient at 90° C. of $1 \times 10^{-8}$ cc·cm/cm$^2$·sec·cmHg or less, thereby allowing superior hydrogen gas permeation resistance to be obtained. The outermost reinforcing layer is a wire braided layer, thereby better impeding disruption of the braided structure compared to a fiber braided layer, even when a hose fitting is forcefully crimped onto a hose end. In addition, the reinforcing layer on the inner circumferential side of the wire braided layer is a fiber braided layer formed by braiding high-strength fibers, thereby yielding commensurate pressure resistance. Disruption of the braided structure of the reinforcing layers as a whole is thus impeded, even when high-pressure hydrogen flows through the hose.

Therefore, it is possible to sufficiently manifest the inherent capabilities of the reinforcing layer, which is advantageous in improving the pressure resistance and durability of the hose. It is also possible to suppress dimensional changes in the inner surface layer by virtue of the reinforcing layers, even if the hydrogen further increases in pressure. In addition, the formation of the inner surface layer from a thermoplastic resin of good hydrogen gas barrier properties and the placement of a wire braided layer as an outermost reinforcing layer, with a fiber braided layer interposed therebetween, remove the wire braided layer from the flowing hydrogen and suppress hydrogen embrittlement thereof. This structure also contributes to improved hose durability.

For example, assume specifications such that the thickness of the inner surface layer is 0.5 mm to 1.5 mm, and the inner diameter thereof is 5 mm to 9 mm. Such specifications allow increased hydrogen flow rate while ensuring the durability of the inner surface layer.

Specifications such that the diameter of the metal wire is 0.25 mm to 0.4 mm, the braid angle thereof is 45° to 55°, and the braid density of the wire braided layer is 70% or greater are also possible. Such specifications make it easier to ensure hose flexibility and metal wire durability while suppressing internal-pressure-induced dimensional changes in the hose.

Specifications such that there are at least two fiber braided layers, the diameter of the high-strength fibers constituting the fiber braided layers is 0.25 mm to 0.30 mm, the braid angle of the innermost fiber braided layer is 45° to 55°, and the braid angle of the second innermost fiber braided layer is 50° to 60° are also possible. Such specifications make it easier to ensure hose flexibility and high-strength fiber durability while suppressing internal-pressure-induced dimensional changes in the hose.

Alternatively, specifications such that the diameter of the metal wire is 0.25 mm to 0.4 mm, the braid angle thereof is greater than 55° up to 60°, and the braid density of the wire braided layer is 70% or greater are also possible. Such specifications are even more advantageous for ensuring hose flexibility and metal wire durability while suppressing internal-pressure-induced dimensional changes in the hose.

Specifications such that there are at least three fiber braided layers, the diameter of the high-strength fibers constituting the fiber braided layers is 0.25 mm to 0.30 mm, the braid angle of the innermost fiber braided layer is 43° to 55°, the braid angle of the second innermost fiber braided layer is 45° to 55°, and the braid angle of the third innermost fiber braided layer is 50° to 60° are also possible. Such specifications make it even easier to ensure hose flexibility and high-strength fiber durability while suppressing internal-pressure-induced dimensional changes in the hose.

Polyparaphenylene benzobisoxazole (PBO) fibers, for example, are used as the high-strength fibers.

DETAILED DESCRIPTION

Figure 1:
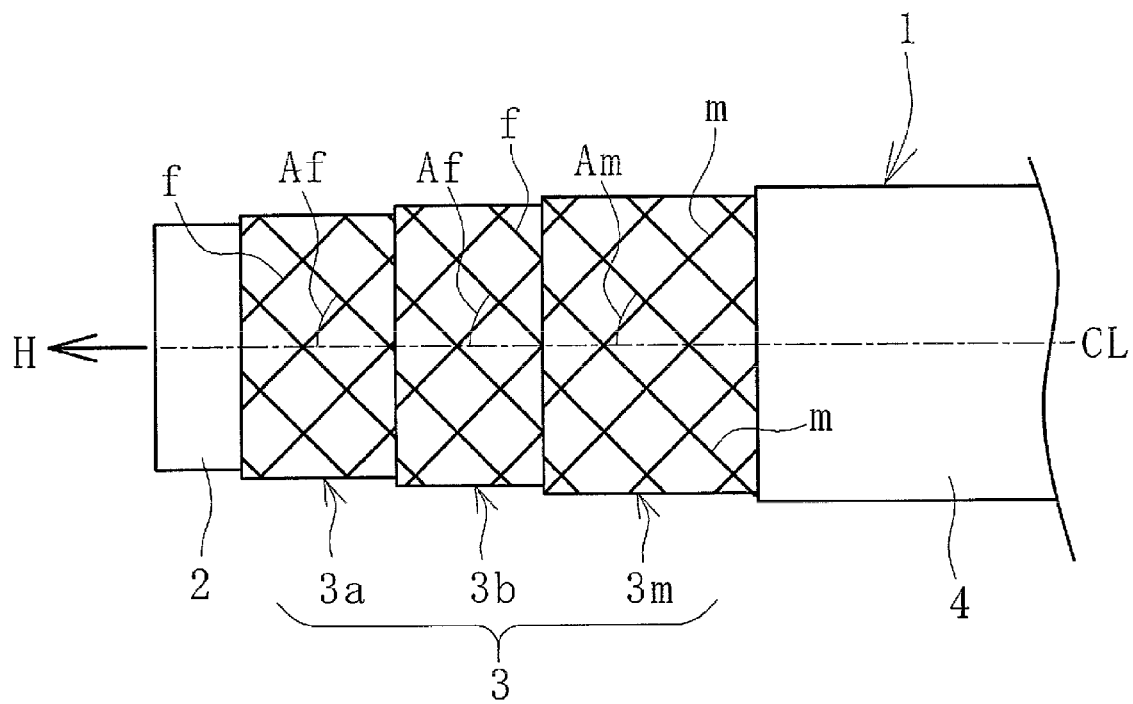
FIG. 1 is a partially cut-away side view illustrating an example of the hydrogen-dispensing hose according to the present technology.

The hydrogen-dispensing hose according to the present technology will be described hereafter on the basis of the embodiments illustrated in the drawings.

Figure 2:
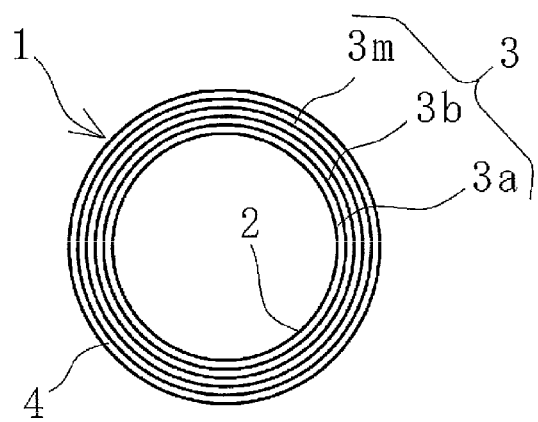
FIG. 2 is a transverse cross-sectional view of the hose illustrated in FIG. 1.

As illustrated in FIGS. 1 and 2, a hydrogen-dispensing hose 1 (hereafter referred to as hose 1 according to the present technology has a structure including, in order from the inner circumferential side thereof, an inner surface layer 2, reinforcing layers 3 (first fiber braided layer 3a, second fiber braided layer 3b, wire braided layer 3m) and an outer surface layer 4, all coaxially layered. The dot-dash line in FIG. 1 indicates the axial center of the hose.

The inner surface layer 2 is formed from a thermoplastic resin having a dry hydrogen gas permeability coefficient at 90° C. of $1\times10^{-8}$ cc·cm/cm$^2$·sec.·cmHg or less. This gas permeability coefficient value is as measured according to JIS (Japanese Industrial Standard) K 7126. Examples of the thermoplastic resin include nylon (nylon 6, nylon 66, nylon 11, etc.), polyacetal, ethylene-vinyl alcohol copolymers, etc.

Using a resin of good hydrogen gas barrier properties for the inner surface layer 2 in this way allows superior hydrogen gas permeation resistance to be obtained. The inner diameter of the inner surface layer 2 (i.e., the inner diameter of the hose 1) is, for example, 4.5 mm to 12 mm, more preferably 5 mm to 9 mm. Increasing the inner diameter of the inner surface layer 2 is advantageous for increasing the flow rate of hydrogen H, and decreasing the inner diameter is advantageous for ensuring pressure resistance.

The thickness of the inner surface layer 2 is, for example, 0.5 mm to 2.0 mm, more preferably 0.5 mm to 1.5 mm. It is preferable to increase the thickness in order to suppress dimensional changes in the inner surface layer 2. Conversely, it is preferable to reduce the thickness of the inner surface layer 2 in order to ensure flexibility on the part of the hose 1. In order to increase the flow rate of hydrogen H while ensuring the durability of the inner surface layer 2, the thickness of the inner surface layer 2 is preferably 0.5 mm to 1.5 mm, and the inner diameter thereof is preferably 5 mm to 9 mm.

The outer surface layer 4 is formed from a thermoplastic resin. Examples of the thermoplastic resin include polyurethanes and polyesters. The thickness of the outer surface layer 4 is, for example, 0.2 mm to 1.0 mm, more preferably 0.5 mm to 0.8 mm. The outer diameter of the outer surface layer 4 (i.e., the outer diameter of the hose 1) is, for example, 12 mm to 18 mm, more preferably 15 mm to 17 mm. Increasing the thickness of the outer surface layer 4 is advantageous for ensuring the weatherablity of the hose 1, and decreasing the outer diameter is advantageous for ensuring flexibility. In order to achieve a balance between weatherability and flexibility in the hose 1, the thickness and outer diameter of the outer surface layer 4 are preferably within the ranges stated above.

At least two reinforcing layers 3 are provided, of which the outermost layer is a wire braided layer 3m formed by braiding metal wires m. The other reinforcing layers 3 are fiber braided layers 3a, 3b formed by braiding high-strength fibers f. In the present embodiment, there are three reinforcing layers 3, with the two fiber braided layers 3a, 3b and the wire braided layer 3m being layered in that order starting from the inner circumferential side. There is no limitation to two fiber braided layers 3a, 3b; there can also be one layer, or three or more.

The high-strength fibers f are fibers having a tensile strength of 2 GPa or greater. Examples of the high-strength fibers f include polyparaphenylene benzobisoxazole fibers (PBO fibers), aramid fibers, and carbon fibers.

The diameter of the high-strength fibers f is, for example 0.25 mm to 0.30 mm. The braid angle Af of the first fiber braided layer 3a is, for example, 45° to 55°, and the braid angle Af of the second fiber braided layer 3b is, for example, 50° to 60°. The braid angle Af of the second fiber braided layer 3b is greater than the braid angle Af of the first fiber braided layer 3a. If there are three or more fiber braided layers, the braid angle Af of the innermost first fiber braided layer 3a is 45° to 55°, and the braid angle Af of the second fiber braided layer 3b and the other fiber braided layers is 50° to 60°. The farther outside the fiber braided layer is disposed, the greater the braid angle Af is.

As the fiber braided layers 3a, 3b are braided with the constituent high-strength fibers f in a deformed state (crushed) state, it is difficult to define the braid density thereof. Thus, defining in terms of fiber count (the number of high-strength fibers f wrapped around each reinforcing layer) instead of braid density, the fiber count will be, for example, 54 to 90 if the outer diameter of the outer circumferential surface around which the high-strength fibers f are wrapped is 7 mm. The fiber count will be, for example, 72 to 120 or 90 to 150 if the outer diameter of the outer circumferential surface around which the high-strength fibers f are wrapped is 10 mm or 12 mm, respectively.

Using high-strength fibers f having a diameter of 0.25 mm to 0.30 mm makes it easier to ensure flexibility on the part of the hose 1 and durability on the part of the high-strength fibers f while suppressing internal-pressure-induced dimensional changes in the hose 1.

For example, steel wire, stainless steel wire, piano wire, or the like is used as the metal wires m. The diameter of the metal wires m is, for example, 0.25 mm to 0.4 mm, more preferably 0.3 mm to 0.35 mm. The braid angle Am is, for example, 45° to 55°, and the braid density Dm of the wire braided layer 3*m* is, for example, 70% to 100%, preferably 80% to 95%. The braid density Dm indicates the area proportion of metal wires m in the wire braided layer 3*m* as a percentage; when the gap between metal wires m is zero, the braid density Dm is 100%.

It is preferable to increase the braid density Dm as the diameter of the metal wires m decreases in order to strike a suitable balance between pressure resistance and flexibility in the hose 1. If the braid density Dm is less than 70%, it will be difficult to ensure sufficient pressure resistance. Conversely, as the braid density Dm approaches 100%, flexibility will decrease, but not so much as to impede practical use. Using metal wires m having a diameter of 0.25 mm to 0.4 mm, a braid angle Am of 45° to 55°, and a wire braided layer 3*m* having a braid density Dm of 70% or greater makes it easier to ensure flexibility on the part of the hose 1 and durability on the part of the metal wires m while suppressing internal-pressure-induced dimensional changes in the hose 1.

Figure 3:
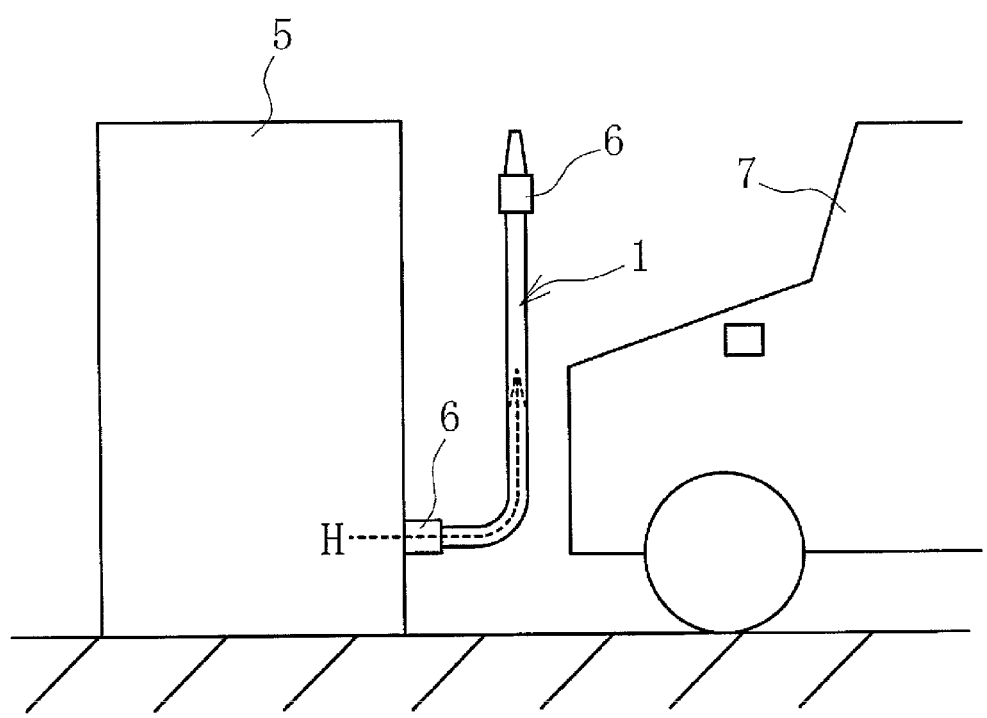
FIG. 3 is an illustration of an example of a dispenser installed at a hydrogen station.

When a dispenser 5 installed at a hydrogen station is equipped with the hose 1 as illustrated in FIG. 3, hose fittings 6 are crimped and attached to both ends of the hose. Hydrogen H is supplied and dispensed from the dispenser 5 through the hose 1 to a vehicle 7 at a low temperature (e.g., −40° to −20°) and high pressure (e.g., 45 MPa to 87.5 MPa).

In accordance with the present hose 1, the inner surface layer 2 is formed from a thermoplastic resin having good hydrogen gas barrier properties as described above, thereby allowing superior hydrogen gas permeation resistance to be obtained. In other words, because the inner surface layer 2 provides a sufficient barrier against the hydrogen H flowing through the hose 1, the amount of hydrogen H permeating to the outer circumferential side of the inner surface layer 2 can be reduced.

Because the outermost reinforcing layer is the wire braided layer 3*m*, disruption of the braided structure of the crimped sections of the hose 1 can be better impeded, even when the hose fittings 6 are forcefully crimped, than if a reinforcing layer of braided fibers were used. In addition, the inner circumferential side of the wire braided layer 3*m* is constituted by the fiber braided layers 3*a*, 3*b* formed by braiding high-strength fibers f, thereby yielding commensurate pressure resistance. Disruption of the braided structure of the three reinforcing layers as a whole is thus impeded, even when high-pressure hydrogen H flows through the hose 1.

Thus, the braided structure is not greatly disrupted even if the reinforcing layers 3 are crimped, thereby allowing sufficient manifestation of the inherent capabilities of the reinforcing layers 3. This is advantageous in improving the pressure resistance and durability of the hose 1. It is also possible to suppress dimensional changes in the inner surface layer 2 by virtue of the reinforcing layers 3, even if the stream of hydrogen H further increases in pressure.

When filling the vehicle 7 with hydrogen H, extremely low-temperature (e.g., −40° C. to −20° C.) hydrogen H flows in contact with the inner surface layer 2, thereby embrittling the inner surface layer 2 due to the low temperature. In addition, the hydrogen H is highly pressurized (e.g., 45 MPa to 87.5 MPa); this pressure acts upon the inner surface layer 2 as internal pressure. The inner surface layer 2 exhibits dimensional change as the result of this internal pressure; because the inner surface layer 2 has been made brittle by the low temperatures, the chance of damage in these usage conditions increases, even in the face of small dimensional changes that would present no problem at standard temperatures.

In addition, because hydrogen H is the smallest molecule, it is capable of penetrating comparatively easily into the inner surface layer 2. This results in a vicious circle in which large amounts of hydrogen H penetrate through even microscopic tears in the inner surface layer 2, thereby increasing the damage. This particular problem arises in the hose 1, through which hydrogen H flows.

In the present technology, a wire braided layer 3*m*, the use of which was conventionally eschewed, is deliberately included along with the first fiber braided layer 3*a* and second fiber braided layer 3*b* formed by braiding high-strength fibers f. The load acting upon the hose 1 as the result of internal pressure is substantially borne by the first fiber braided layer 3*a* and the second fiber braided layer 3*b*. This solves the abovementioned particular problem.

In the present structure, the wire braided layer 3*m* does not substantially bear the load acting upon the hose 1 as the result of internal pressure. Thus, even if hydrogen embrittlement of the metal wires m making up the wire braided layer 3*m* were to occur, this would not immediately impede the use of the hose 1.

Only the one outermost layer of the reinforcing layers 3 is a wire braided layer 3*m*, and the other reinforcing layers 3 are the fiber braided layers 3*a*, 3*b*, thereby also ensuring sufficient flexibility on the part of the hose 1. This results in a structure in which the wire braided layer 3*m* does not substantially bear the load acting upon the hose 1 as the result of internal pressure, thereby eliminating the need to provide multiple wire braided layers 3*m*, and contributing not only to the flexibility but also reduced weight on the part of the hose 1.

Figure 4:
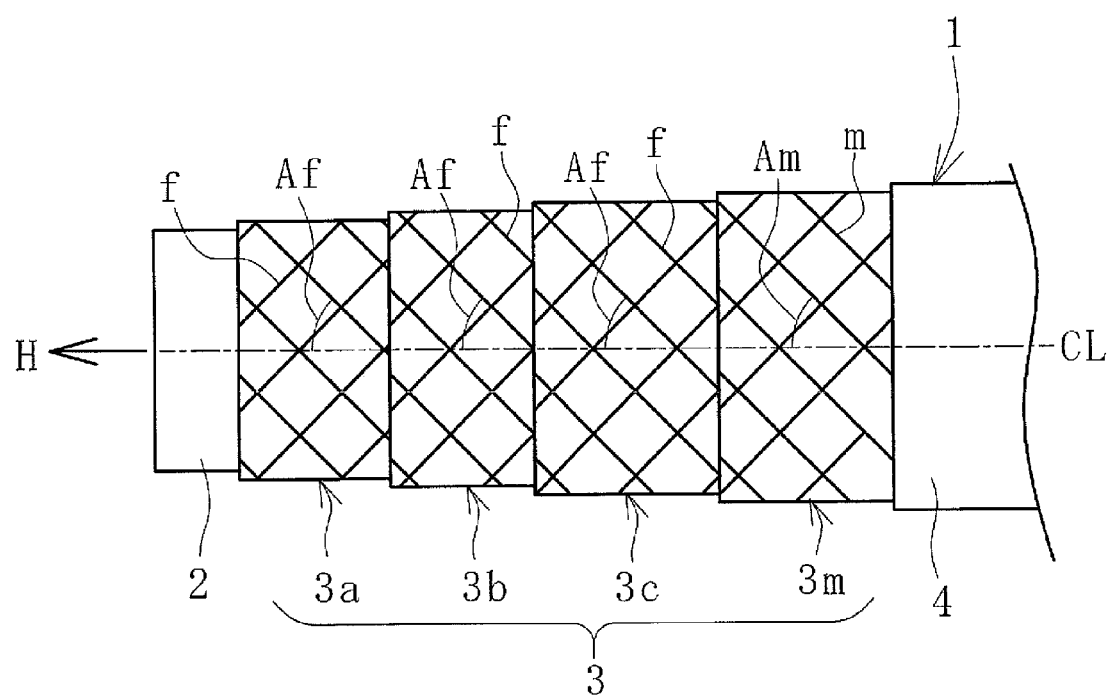
FIG. 4 is a partially cut-away side view illustrating an examples of another embodiment of the hydrogen-dispensing hose according to the present technology.

In the embodiment of a hose 1 illustrated in FIG. 4, there are four reinforcing layers 3, with three fiber braided layers 3*a*, 3*b*, 3*c* and a wire braided layer 3*m* being layered in that order starting from the inner circumferential side.

The diameter of the high-strength fibers f is, for example 0.25 mm to 0.30 mm. The braid angle Af of the first fiber braided layer 3*a* is, for example, 43° to 55°, the braid angle Af of the second fiber braided layer 3*b* is, for example, 45° to 55°, and the braid angle Af of the third fiber braided layer 3*c* is, for example, 50° to 60°. The braid angle Af of the second fiber braided layer 3*b* should be greater than the braid angle Af of the first fiber braided layer 3*a*, and the braid angle Af of the third fiber braided layer 3*c* should be greater than the braid angle Af of the second fiber braided layer 3*b*. For example, the difference between the braid angle Af of the first fiber braided layer 3*a* and the braid angle Af of the second fiber braided layer 3*b* should be at least 4°, and the difference between the braid angle Af of the second fiber braided layer 3*b* and the braid angle Af of the third fiber braided layer 3*c* should be at least 4°.

Thus, defining the fiber braided layers 3*a*, 3*b*, 3*c* in terms of fiber count (the number of high-strength fibers f wrapped around each reinforcing layer) instead of braid density, the fiber count will be, for example, 54 to 90 if the outer diameter of the outer circumferential surface around which the high-strength fibers f are wrapped is 7 mm. The fiber count will be, for example, 72 to 120 or 90 to 150 if the outer diameter of the outer circumferential surface around which the high-strength fibers f are wrapped is 10 mm or 12 mm, respectively.

The diameter of the metal wires m is, for example, 0.25 mm to 0.4 mm, more preferably 0.3 mm to 0.35 mm. The braid angle Am is, for example, greater than 55° up to 60°, and the braid density Dm of the wire braided layer 3m is, for example, 70% to 100%, preferably 80% to 95%.

In the present embodiment, the braid angle Am of the metal wires m is greater than in the previous embodiment, and equal to or greater than the static angle (54.7°). In addition, there is a greater number of fiber braided layers 3a, 3b, 3c, and the fiber braided layers 3a, 3b, 3c have different braid angles Af.

This difference in specifications improves the failure pressure of the hose 1 of the present embodiment compared to the hose 1 of the previous embodiment. In addition, less dimensional change occurs when internal pressure acts upon the hose 1, thereby further improving dimensional stability and reduced strain upon the inner surface layer 2.

Specifically, when internal pressure acts upon the hose 1, the first fiber braided layer 3a and the second fiber braided layer 3b, for which the braid angle Af is substantially equal to or less than the static angle, increase in diameter as the braid angle Af approaches the static angle, efficiently transferring the internal pressure to the third fiber braided layer 3c and the wire braided layer 3m. As a result, the capabilities of the respective reinforcing layers 3 (3a, 3b, 3c, 3m) can be made to function in a balanced manner without placing an excessive pressure resistance load upon a specific reinforcing layer 3. In addition, the synergy of the increase in the number of fiber braided layers 3a, 3b, 3c and the imparting of each with a specific braid angle Af improves the failure pressure of the hose 1.

The braid angle Am of the metal wires m is equal to or greater than the static angle (54.7°); thus, when internal pressure acts upon the hose 1, the braid angle Am approaches the static angle, and the wire braided layer 3m suppresses an increase in the diameter of the hose 1. As a result, the degree of dimensional change in the hose 1 decreases, thereby enabling the effective reduction in strain (diameter-increasing deformation) in the inner surface layer 2. Concurrently, the durability of the hose 1 is improved, which is even more advantageous in lengthening the life of the hose 1.

When hydrogen is flowing through the hose 1, the inner surface layer 2 is at a low temperatures at or below the freezing point, thereby causing the inner surface layer 2 to become brittle and more prone to tearing. Thus, a hose 1 capable of sufficiently suppressing diameter-expanding distortion in the inner surface layer 2, as in the case of the present inner surface layer 2, has vastly improved practical utility.

When the degree of dimensional change in the hose 1 under internal pressure decreases, thereby suppressing lengthwise-directional changes in the hose 1, the generation of unnecessary lengthwise-directional force in the hose 1 while hydrogen H is being supplied and dispensed from the dispenser 5 to the vehicle 7 is inhibited. This is also advantageous for preventing the generation of force that would disturb the connection between the hose 1 and the hose fittings 6.

Examples

Four analytical models (Examples 1-3, Comparative Example) of structures similar to that of the hose illustrated in FIG. 1 were prepared, with only the specifications of the reinforcing layers different as shown in Table 1, and analyzed and evaluated for disruption of the reinforcing layers and diameter increase (dimensional change) in the inner surface layers. The first layer in Table 1 is the innermost layer, the second layer is a layer layered on the outer circumferential surface of the first layer, and the third layer is the outermost layer. The dry hydrogen gas permeability coefficient of the inner surface layer at 90° C. is $1 \times 10^{-8}$ cc·cm/cm$^2$·sec.·cmHg or less. Test samples of the four models were prepared, and hose fittings having identical specifications were crimped and attached to hose ends using identical levels of crimping force to create hose assemblies, which were evaluated for pressure resistance. In the pressure resistance test, failure pressure was measured according to the method set forth in JIS K 6330-2. The evaluation results are shown in Table 1. Failure pressure was evaluated in terms of an index against a reference value of 100 for the comparative example. A larger index value indicates greater pressure resistance. Failure mode is also indicated.

Disruption of Reinforcing Layers

Hose fittings of identical specifications were crimped and attached to hose ends using identical levels of crimping force, and the degree of disruption (vertical displacement) of the braided structure in the crimped sections of the outermost reinforcing layers at a hose internal pressure of 80 MPa was evaluated in terms of an index against a reference value of 100 for the comparative example. A smaller index value indicates less disruption.

Level of Diameter-Expanding Deformation of Inner Surface Layer

The level of diameter-expanding deformation of the inner diameter of the inner surface layer under conditions identical to those used to evaluate disruption of the reinforcing layers as described above was evaluated in terms of an index against a reference value of 100 for the comparative example. A smaller index value indicates less diameter-expanding deformation.

TABLE 1

| | | Examples | | | Comparative |
| --- | --- | --- | --- | --- | --- |
| | | 1 | 2 | 3 | Example |
| Inner surface layer | Material | Nylon 6 | | | Nylon 11 |
| | | Thickness: 1.0 mm; | | | |
| | | inner diameter: 8.0 mm | | | |
| Outer surface layer | | Material: polyester | | | |
| | | Thickness: 0.8 mm; | | | |
| | | outer diameter: 16 mm | | | |
| Reinforcing layer | First layer | Wire material | | | |
| | | PBO fibers | | | |
| | | Diameter (mm) | | | |
| | | 0.28 | | | |
| | | Braid angle (°) | | | |
| | | 46 | | | |
| | | Fiber count | | | |
| | | 96 | 96 | 96 | 96 |
| | Second layer | Wire material | | | |
| | | PBO fibers | | | |
| | | Diameter (mm) | | | |
| | | 0.28 | | | |
| | | Braid angle (°) | | | |
| | | 51 | | | |
| | | Fiber count | | | |
| | | 108 | 96 | 96 | 96 |

TABLE 1-continued

|  | Examples | | | Comparative Example |
|---|---|---|---|---|
|  | 1 | 2 | 3 |  |
| Third layer | Wire material | | | |
|  | Steel wire | | | PBO fibers |
|  | Diameter (mm) | | | |
|  | 0.35 | | | 0.28 |
|  | Braid angle (°) | | | |
|  | 50 | 51 | 53 | 56 |
|  | Braid density (%) | | | Fiber count |
|  | 82 | 82 | 82 | 96 |
| Disruption of reinforcing layers (index) | 85 | 90 | 90 | 100 |
| Level of diameter-expanding deformation of inner surface layer (index) | 70 | 75 | 75 | 100 |
| Failure pressure (index) | 100 | 105 | 105 | 100 |
| Failure mode | Hose body failure | | | Fitting base failure |

It is apparent from the results shown in Table 1 that Examples 1 to 3 exhibit less disruption of the braided structure of the outermost reinforcing layer than the comparative example, and less diameter-expanding deformation of the inner surface layer. In addition, the failure mode of the hoses of Examples 1 to 3 was hose body failure, thereby confirming that the inherent capability of the reinforcing layer was sufficiently manifested, and the layers had superior pressure resistance.

Next, as shown in Table 2, three test samples including a first fiber braided layer, a second fiber braided layer a third fiber braided layer, and a wire braided layer as reinforcing layers, and having only different reinforcing layer specifications as shown in Table 2 (Examples 4 to 6) were prepared in addition to the test sample including a first fiber braided layer, a second fiber braided layer, and a wire braided layer in that order starting from the inner circumferential side as reinforcing layers (Example 3) for a total of four test samples. Using these four test samples, hose fittings having identical specifications were crimped and attached to hose ends using identical levels of crimping force to create hose assemblies, which were evaluated for pressure resistance, dimensional change (change in length and change in outer diameter) during hose pressurization, and diameter-expanding deformation of the inner surface layer. The dry hydrogen gas permeability coefficient of the inner surface layer at 90° C. was $1 \times 10^{-8}$ cc·cm/cm$^2$·sec.·cmHg or less. In the pressure resistance test, failure pressure was measured according to the method set forth in JIS K 6330-2. The evaluation results are shown in Table 2. Evaluation results were expressed in terms of an index against a reference value of 100 for the comparative example. Larger index values indicate more superior pressure resistance, and smaller index values indicate less dimensional change and diameter-expanding deformation.

TABLE 2

|  | Examples | | | |
|---|---|---|---|---|
|  | 3 | 4 | 5 | 6 |
| Inner surface layer | Material | | | |
|  | Nylon 11 | | | |
|  | Thickness: 1.0 mm; inner diameter: 8.0 mm | | | |
| Outer surface layer | Material: polyester | | | |
|  | Thickness: 0.8 mm; outer diameter: 16 mm | | | |

TABLE 2-continued

|  |  | Examples | | | |
|---|---|---|---|---|---|
|  |  | 3 | 4 | 5 | 6 |
| Reinforcing layer | First fiber braided layer | Wire material | | | |
|  |  | PBO fibers | | | |
|  |  | Diameter (mm) | | | |
|  |  | 0.28 | | | |
|  |  | Braid angle (°) | | | |
|  |  | 46 | 43 | 47 | 53 |
|  |  | Fiber count | | | |
|  |  | 96 | 96 | 96 | 96 |
|  | Second fiber braided layer | 16 Wire material | | | |
|  |  | PBO fibers | | | |
|  |  | Diameter (mm) | | | |
|  |  | 0.28 | | | |
|  |  | Braid angle (°) | | | |
|  |  | 51 | 48 | 50 | 55 |
|  |  | Fiber count | | | |
|  |  | 96 | 96 | 96 | 96 |
|  | Third fiber braided layer | Wire material | | | |
|  |  | PBO fibers | | | |
|  |  | Diameter (mm) | | | |
|  |  | 0.28 | | | |
|  |  | Braid angle (°) | | | |
|  |  | — | 52 | 56 | 55 |
|  |  | Fiber count | | | |
|  |  | — | 96 | 96 | 96 |
|  | Wire braided layer | Wire material | | | |
|  |  | Steel wire | | | |
|  |  | Diameter (mm) | | | |
|  |  | 0.35 | | | |
|  |  | Braid angle (°) | | | |
|  |  | 53 | 56 | 57 | 57 |
|  |  | Braid density (%) | | | |
|  |  | 82 | 82 | 82 | 82 |
| Burst pressure (index) |  | 100 | 160 | 160 | 110 |
| Change in hose length (index) |  | 100 | 90 | 50 | 10 |
| Change in hose outer diameter (index) |  | 100 | 75 | 40 | 25 |
| Level of diameter-expanding deformation of inner surface layer (index) |  | 100 | 80 | 50 | 30 |

It is apparent from the results shown in Table 2 that Examples 4 to 6 have superior pressure resistance compared to Example 3, and less dimensional change (change in length and change in outer diameter) and diameter-expanding deformation of the inner surface layer under hose pressurization. It is known that suppressing diameter-expanding deformation (strain) of the inner surface layer under hose pressurization increases hose life, and it was also ascertained that hose life increases at least 1.5 times when diameter-expanding deformation of the inner surface layer is reduced by about 30%. Therefore, it is possible, according to Examples 4 to 6, to greatly improve hose life compared to Example 3.

The invention claimed is:

1. A hydrogen-dispensing hose, comprising:
   A coaxially layered inner surface layer and outer surface layer; and
   at least two reinforcing layers coaxially layered between the coaxially layered inner layer and outer surface layer, the inner surface layer being formed from a thermoplastic resin having a dry hydrogen gas permeability coefficient at 90° C. of $1 \times 10^{-8}$ cc·cm/cm$^2$·sec.·cmHg or less, and the outer surface layer being formed from a thermoplastic resin;
   the outermost reinforcing layer out of the reinforcing layers being a wire braided layer formed by braiding metal wires; and the other reinforcing layer being a fiber braided layer formed by braiding high-strength fibers;

wherein the fiber braided layer is composed of at least three layers, a diameter of high-strength fibers constituting the fiber braided layer is 0.25 mm to 0.30 mm, a braid angle of an innermost fiber braided layer is 43° to 55°, a braid angle of a second innermost fiber braided layer is 45° to 55°, and a braid angle of a third innermost fiber braided layer is 50° to 60°.

2. The hydrogen-dispensing hose according to claim 1, wherein the thickness of the inner surface layer is 0.5 mm to 1.5 mm, and the inner diameter thereof is 5 mm to 9 mm.

3. The hydrogen-dispensing hose according to claim 1, wherein the diameter of the metal wire is 0.25 mm to 0.4 mm, the braid angle thereof is 45° to 55°, and the braid density of the wire braided layer is 70% or greater.

4. The hydrogen-dispensing hose according to claim 1, wherein the diameter of the metal wire is 0.25 mm to 0.4 mm, the braid angle thereof is greater than 55° up to 60°, and the braid density of the wire braided layer is 70% or greater.

5. The hydrogen-dispensing hose according to claim 1, wherein the high-strength fibers are polyparaphenylene benzobisoxazole fibers.

6. The hydrogen-dispensing hose according to claim 1, wherein the hose is configured for use with an internal pressure acting on the hose of from 45 MPa to 87.5 MPa and with a temperature of hydrogen flowing through the hose of from −40° C. to −20° C.

* * * * *